United States Patent [19]

Bohannan et al.

[11] Patent Number: 4,997,503

[45] Date of Patent: Mar. 5, 1991

[54] FILAMENT WINDING APPARATUS AND METHOD

[75] Inventors: John R. Bohannan, Dewey; James E. O'Connor; Larry M. Selby, both of Bartlesville, all of Okla.

[73] Assignee: Phillips Petroleum Company, Bartlesville, Okla.

[21] Appl. No.: 381,791

[22] Filed: Jul. 19, 1989

[51] Int. Cl.$^5$ .................... B31C 13/00; B65H 18/10
[52] U.S. Cl. .................... 156/195; 156/173; 156/425; 156/446; 156/499
[58] Field of Search ............ 156/173, 175, 425, 446, 156/171, 172, 195, 169, 499

[56] References Cited

U.S. PATENT DOCUMENTS

| | | | |
|---|---|---|---|
| 3,025,205 | 3/1962 | Young | 156/169 |
| 3,112,234 | 11/1963 | Krupp | 156/175 X |
| 3,698,986 | 10/1972 | Okmura | 156/393 |
| 3,970,495 | 7/1976 | Ashton et al. | 156/162 |
| 4,078,957 | 3/1978 | Bradt | 156/173 |
| 4,267,007 | 5/1981 | Kellog | 156/425 |
| 4,374,689 | 2/1983 | Smith et al. | 156/169 |
| 4,381,960 | 5/1983 | Pinter et al. | 156/175 |
| 4,610,402 | 9/1986 | Corbett et al. | 156/425 X |
| 4,720,366 | 1/1988 | Binnersley et al. | 264/172 |
| 4,838,971 | 6/1989 | Cacak | 156/175 X |

*Primary Examiner*—Michael L. Lewis
*Attorney, Agent, or Firm*—Laney, Dougherty, Hessin & Beavers

[57] ABSTRACT

Apparatus and methods are provided for simultaneously winding at least two filament reinforced thermoplastic strips onto a mandrel or similar form, comprising: a rotatable mandrel for receiving the strips; a winding assembly for rotating the mandrel and winding the strips onto the mandrel; a strip feeder, for feeding the strips to the mandrel as the mandrel rotates; and a joining assembly, located between the feeder and the mandrel, for ceaselessly urging the strips into generally parallel, contiguous juxtaposition. The joining assembly comprises an arcuate member having an inside radius positioned to deflectingly contact the strips between the strip feeder and the mandrel. Preferably, the joining assembly is connected to the exit of the strip feeder.

13 Claims, 2 Drawing Sheets

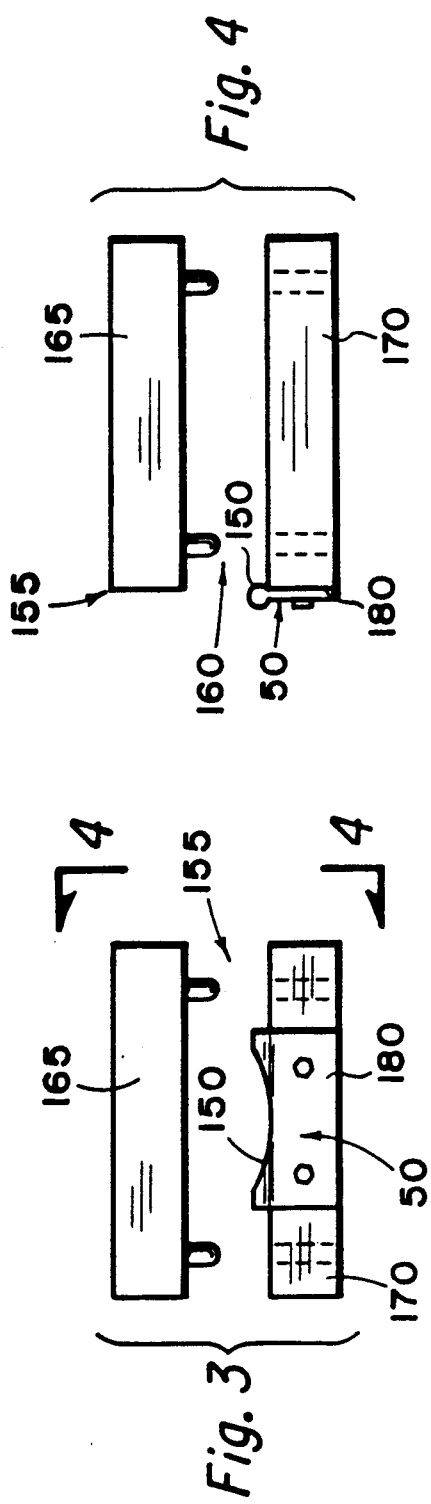
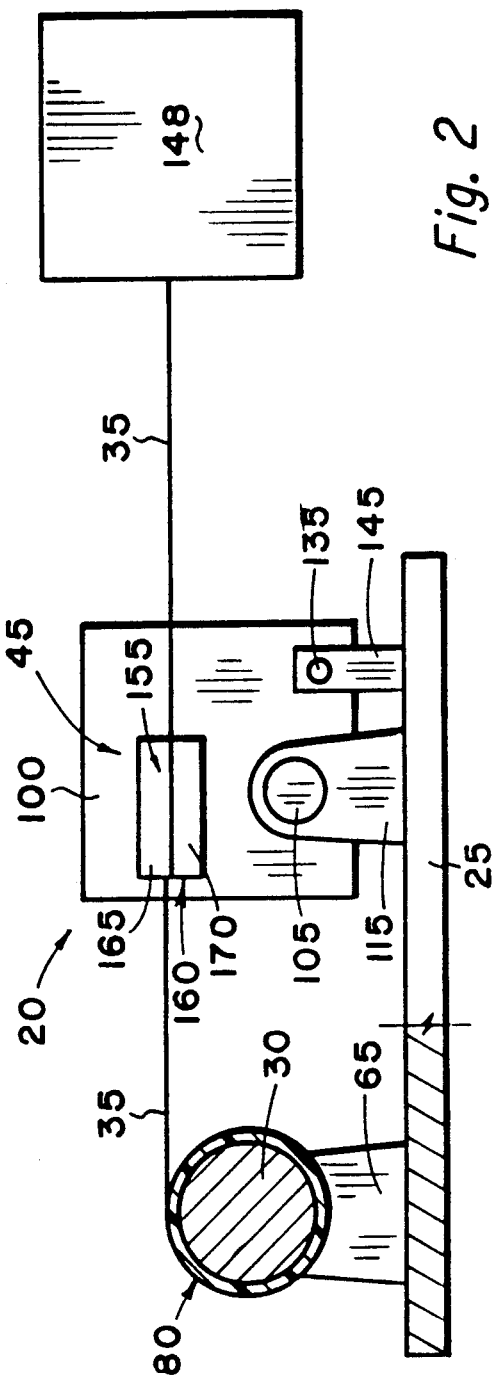

FILAMENT WINDING APPARATUS AND METHOD

BACKGROUND OF THE INVENTION

1. Field of the Invention

This invention relates to apparatus and methods for winding strips of filament reinforced thermoplastic onto rotating objects in order to produce wound structures. More particularly, the invention relates to apparatus and methods for simultaneously winding a plurality of filament reinforced thermoplastic strips onto a rotating object, such as a mandrel.

2. Description of the Prior Art

Fiber or filament reinforced polymers, including thermosets and thermoplastics, are known for their high strength, light weight, corrosion resistance, and ease of fabrication compared to the wood or metal structures which they commonly replace. Because of these qualities, the filament reinforced thermoset and thermoplastic structures are in increasing demand by many industries, particularly the aerospace industry.

The winding of a strip of polymer, plastic, rubber, and other materials to make cylindrical articles is well known. Particularly such use of thermoset polymer composites, including polyester, vinylester, and epoxies, is well known. Pipe, hose, and storage tanks, particularly underground storage tanks, are articles commonly made by such winding. It is also known to construct such cylindrical structures by winding a filament reinforced thermoplastic strip in multiple layers upon a rotating form or mandrel. This is commonly known as filament winding and the apparatus is commonly called a filament winding machine. One type of filament winding apparatus and method, as well as typical materials used therewith, is described in U.S. Pat. No. 4,078,957, issued to Bradt, which is incorporated herein by reference thereto.

Normally, the strip is moved laterally with respect to the longitudinal axis of the mandrel as the mandrel rotates in order to evenly distribute the strips in a layer along the length of the mandrel. The strips are normally helically wound on the mandrel with adjacent layers wound in opposing or crossed helixes. It is usually desired to distribute the strips in contiguous juxtaposition, i.e., in side to side contact, in order to form a continuous structure.

The filament reinforced thermoplastic strip may be produced immediately prior to being wound on the mandrel by a well known process, such as the wet impregnation process. In the wet impregnation process, a plurality of fibers or filaments are pulled from a creel and through a resin bath for impregnation of the filaments with the resin. The resin impregnated filaments, commonly referred to as "prepreg feed material" are pulled through a heated forming zone to form the filament reinforced thermoplastic strip to be wound about the mandrel.

More typically, the filament reinforced thermoplastic strip is purchased or provided to the filament winding apparatus ready-made. Such ready-made filament reinforced thermoplastic strips are commonly known as preimpregnated strips, prepregs, tow pregs, pregs, and other similar names.

Filament reinforced thermoplastic strips may be wound to create structures of various sizes and shapes. In many such structures, the width of the strip may need to be closely controlled in order to produce the desired shape of wound structure in an acceptable quality. For example, in a wound structure of large size, it may be desirable to use wide strips in order to speed the winding process. It is common to need a width of strip which is not readily available in a single premanufactured "prepreg" strip. In such a situation, it would be of great advantage to be able to simultaneously wind multiple strips which in combination add to the desired overall strip width.

It is also common to have a single cylindrical shape which has areas of various diameters, continuously increasing or decreasing diameters, etc. In such structures, because of the helical pattern of the strip, one side of the strip must cover more wound structure surface area, i.e., the side of the strip which is being applied to the area of wound structure having larger diameter must cover more structure. If one strip of desired width is used, wrinkling or strip damage may occur because of the change in mandrel, or wound structure, diameter and tension across the width of the strip. In such a situation, it would be of great advantage to use simultaneously applied multiple strips which are free to travel at differing speeds and distances in order to accommodate the changing diameter of the mandrel.

However, the industry has met with limited success in simultaneously winding multiple plastic strips. A major problem encountered when constructing filament reinforced thermoplastic structures by simultaneously winding a plurality of strips upon a rotating mandrel, is that the strips separate and create gaps or voids in the layer of the structure being created. This problem is worse if the mandrel is large, e.g., greater than four inches in diameter, or if the combined width of the simultaneously applied strips is relatively narrow, because the lateral motion of the simultaneously applied strips with respect to the longitudinal axis of the mandrel is slow. (Normally, the mandrel and strip supply means are adjusted so that the strip advances along the longitudinal axis of the mandrel with each rotation of the mandrel.) This slow lateral motion increases the tendency of the simultaneously applied strips to separate and create gaps or voids in the layer of the structure being wound. These gaps or voids also weaken the structure and create a need to either increase the number of layers or otherwise compensate for such gaps and voids.

The present invention is directed to apparatus and methods which prevent the separation of filament reinforced thermoplastic strips which are simultaneously applied to a rotating mandrel or similar object.

SUMMARY OF THE INVENTION

Accordingly, the present invention provides apparatus and method for simultaneously winding at least two filament reinforced thermoplastic strips onto a mandrel, comprising: a rotatable mandrel, or similar form, for receiving the strips; winding means for rotating the mandrel and winding the strips onto the mandrel; feeder means for feeding the strips to the mandrel as the mandrel rotates; and joining means, disposed between the feeder means and the mandrel, for ceaselessly urging the strips into contiguous juxtaposition. Preferably, the joining means includes an arcuate member having an inside radius which transversely contacts the strips for urging the strips into contiguous juxtaposition. The arcuate member is normally located near the exit of the feeder means.

The apparatus may also include heating means, located between the feeder means and the mandrel, for heating the strips to a thermally-softened or semi-molten state in which the strips will fuse together when contiguously juxtaposed by the joining means. Normally, the heating means is a heating die which is connected to the feeder means. The joining means is preferably placed at the exit of the heating means.

It is an advantage of the present invention to provide an apparatus and method for simultaneously winding multiple strips onto a rotating object while contiguously juxtaposing the strips.

It is an advantage of the present invention to provide apparatus and method for simultaneously applying multiple strips to a rotating object with the strips being free to travel at differing speeds and distances while contiguously juxtaposing the strips.

It is an advantage of the present invention to provide apparatus and method for simultaneously winding a plurality of strips on a rotating object while eliminating separation or gaps and voids between the strips.

It is an advantage of the present invention to provide apparatus and method for simultaneously winding multiple strips at relatively slow speeds onto a rotating object while maintaining contiguous juxtaposition of the strips on the rotating object.

It is an advantage of the present invention to provide apparatus and method for simultaneously winding multiple strips onto a rotating object of varying diameter while maintaining contiguous juxtaposition of the strips on the rotating object.

Numerous features and advantages of the present invention will be readily apparent to those skilled in the art upon a reading of the following disclosure when taken in conjunction with the accompanying drawings.

BRIEF DESCRIPTION OF THE DRAWINGS

The present invention will be better understood by reference to the examples of the following drawings:

FIG. 2 is a schematic side elevation view taken along line 2—2 of FIG. 1.

FIG. 3 is a schematic end view of a die illustrating an embodiment of the joining means of the present invention.

FIG. 4 is a schematic side view of FIG. 3.

DETAILED DESCRIPTION OF THE PREFERRED EMBODIMENTS

Figure 1:
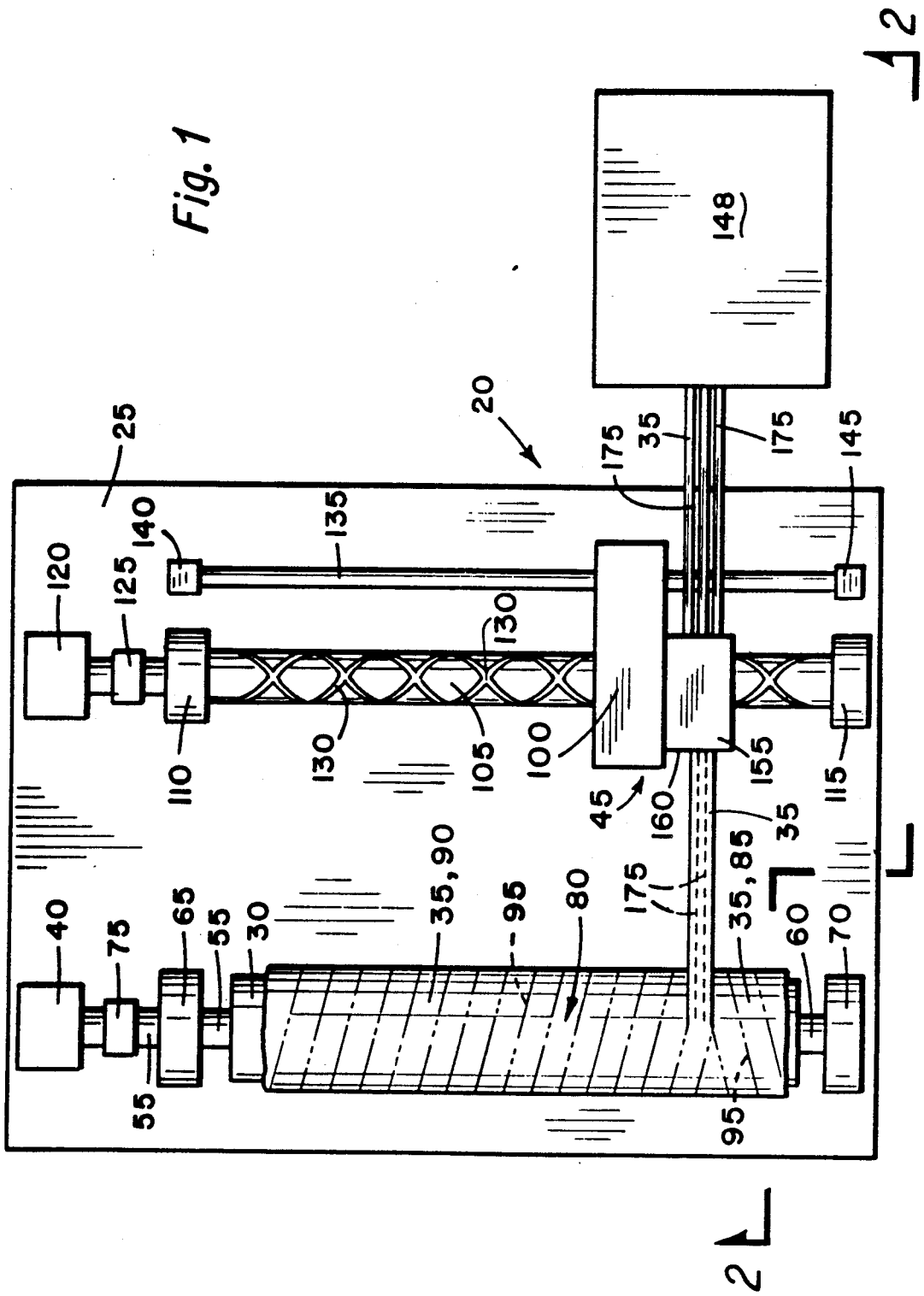
FIG. 1 is a schematic plan view of an apparatus for simultaneously winding a plurality of filament reinforced thermoplastic strips in accordance with the present invention.

Before explaining the present invention in detail, it is to be understood that the invention is not limited to the details of construction and arrangement of parts illustrated in the accompanying drawings, since the invention is capable of other embodiments and of being practiced or carried out in various ways commensurate with the claims herein. Also, it is intended to be understood that the phraseology or terminology employed herein is for the purpose of description and not of limitation.

FIGS. 1–4 embody apparatus and method for simultaneously winding at least two filament reinforced thermoplastic strips onto a mandrel in accordance with the present invention.

Referring to the example of FIGS. 1–3, the apparatus 20 may be described as being generally comprised of a rotatable mandrel 30 for receiving the strips 35; winding means 40 for rotating the mandrel 30 and winding the strips 35 onto the mandrel 30; feeder means 45, for feeding the strips 35 to the mandrel 30 as the mandrel 30 rotates; and joining means 50, disposed between the feeder means 45 and the mandrel 30, for ceaselessly urging the strips 35 into generally parallel, contiguous juxtaposition. The apparatus 20 should be suitably mounted and properly aligned upon a support structure 25, which may be a frame, foundation, floor, or similar structural base, also designated 25, as is well known in the art.

Referring to the example of FIG. 1, the mandrel 30 has reduced diameter end portions 55, 60 which are journaled in bearing blocks 65, 70, respectively. The bearing blocks 65, 70 are mounted upon the base 25. The mandrel 30 is rotatably driven by the winding means 40. The winding means 40 may be any suitable rotational drive assembly, such as an electric motor, also designated 40, which is typically connected to reduced diameter end portion 55 of mandrel 30 by a drive coupling 75 in order to rotate the mandrel 30.

The mandrel 30, which is usually of generally cylindrical shape, is constructed for receiving the filament reinforced thermoplastic strips 35 in multiple wound layers to form a tubular or cylindrical filament reinforced thermoplastic structure 80 around the mandrel 30. The structure 80 is created or formed by the multiple layers of strips 35 wound around the mandrel 30. The mandrel 30 may be any rotating object or form upon which the strips 35 may be wound and may take virtually any shape, e.g., spherical, rectangular, conical, etc.

Referring to the example of FIG. 1, an underlying first layer 35, 85 comprised of a negatively sloped spiral or helical winding of strips 35 is schematically represented in phantom lines, as is an overlying second layer 35, 90 which is in the process of being formed by a positively sloped spiral winding of strips 35. The adjacent edges 95 of the spiral windings 35, 85 or 35, 90 are illustrated by phantom lines because the wound strips will normally be fused together so that the edges 95 of adjacent wound strips within any given layer will not be distinguishable.

These multiple layers of the strips 35 upon the mandrel 30 are created by rotating the mandrel 30 in a counterclockwise direction as viewed in FIG. 2, while simultaneously reciprocating the feeder means 45 with respect to, and generally parallel with, the longitudinal axis of the mandrel 30. In the preferred embodiment, referring to FIG. 1, the feeder means 45 includes a traveling carriage means 100 which reciprocates along the length of a threaded, rotating carriage drive shaft 105 for carrying the strips 35 along the length of the shaft 105 and distributing the strips 35 along the length of the mandrel 30. The carriage drive shaft 105 is journaled in bearing blocks 110, 115. A suitable drive assembly such as an electric motor 120 is rotatingly connected to carriage drive shaft 105 by drive coupling 125.

The carriage drive shaft 105 has a bidirectional spiraled, or helical, groove or thread 130 in the surface thereof which causes the carriage 100 to move back and forth along the length of the shaft 105 as shaft 105 is rotated, in a manner well known to those skilled in the art. This causes the strips 35 to be wound upon the rotating mandrel 30 in spiraled or helical layers such as 35, 85 and 35, 90. The feeder means 45 or carriage drive shaft 105 and mandrel 30 should be adjusted or operably interconnected so that the carriage means 100 advances along the mandrel 30 the width of the simultaneously wound strips 35 with each rotation of the mandrel 30. In other words, each band of simultaneously wound strips 35 should be wound in contiguous juxtaposition with the immediately prior wound band of strips 35.

A guide shaft 135 is supported from the frame 35 by posts 140, 145 to prevent the carriage 100 from rotating with the carriage drive shaft 105.

Referring to the example of FIGS. 1 and 2, the filament reinforced thermoplastic strips 35 are provided to the feeder means by supply means 148. Supply means 148 may be an in-line wet impregnation process or equivalent process for producing strips 35 (not illustrated) as are known in the art. More typically, the supply means 148 will be a source of ready-made strips 35, such as a spool (not illustrated) and will also typically include a tow comb (not illustrated). A tow comb is a well known device which guides the strips 35 and keeps the strips 35 separated prior to entering the feeder means 45.

The feeder means 45 and mandrel 30 are normally positioned so that the strips 35 traveling from the feeder means 45 to the mandrel 30 will define a generally linear path of travel. The joining means 50 is located between the feeder means 45 and the mandrel 30 and should be mounted to reciprocate with the feeder means 45. In the preferred embodiment, best seen in FIG. 3, the joining means 50 is positioned to deflect the strips 35 from the linear path of travel between the feeder means 45 and the mandrel 30. There is normally tension in the strips 35 created by the rotational pull of the mandrel 30 on the strips 35. This tension, together with the deflection of the strips 35 by the joining means 50, creates opposing forces between the joining means 50 and the strips 35; and the joining means 35 utilizes these forces to ceaselessly urge the strips 35 into contiguous juxtaposition. Preferably, the joining means 50 is located near the point at which the strips 35 exit from the feeder means 45, as further discussed below.

Referring to the example of FIGS. 3 and 4, in a more preferred embodiment, the joining means 50 comprises an arcuate member 150 constructed and arranged with the inside radius of the arcuate member 150 transversely contactable with the strips 35. The radius of the arcuate member 150, together with the forces exerted on the arcuate member 150 by the tensioned strips 35, ceaselessly urge the strips 35 into contiguous juxtaposition. In the preferred embodiment, the arcuate member is positioned to deflect the strips 35 at least about one-eighth of an inch from the linear path of travel between the feeder means 45 and the mandrel 30. The inventors have found that deflection significantly greater than one-eighth of an inch may create excessive forces between the arcuate member 150 or joining means 50 and the strips 35 which may damage the filaments or fibers in the strips 35 and therefore weaken the fibers. Conversely, deflections significantly less than one-eighth of an inch may not create sufficient opposing forces between the joining means 50 and strips 35 to urge the strips 35 into contiguous juxtaposition. The amount of deflection should be adjusted to accommodate variations in the tensile forces in the strips 35. With greater tensile forces, deflections less than one-eighth of an inch can probably be used and with smaller tensile forces, deflections greater than one-eighth of an inch may be needed.

For a specific mandrel or structure to be wound, the arcuate member 150 should be sized to receive the widest strip (the greatest combined width of multiple strips) to be wound onto the mandrel, i.e., the length of the arc of the inside radius of the arcuate member 150 should be greater than the combined width of the strips 35 to be simultaneously wound. Different sizes of arcuate members may be required and used with different widths of simultaneously wound strips 35.

The arcuate member 150 may be an arcuately shaped bar, tube, plate, etc. and should not have abrupt or sharp edges which contact the strips 35, as such edges can damage or break the strips 35 or filaments within the strips 35 and thereby weaken the strips 35. The arc of the arcuate member should be substantially continuous in order to ceaselessly urge the strips 35 into contiguous juxtaposition, i.e., the arcuate member should not have any flat portions of a large magnitude relative to the width of the strips. By flat is meant flat or linear in a plane parallel with the longitudinal axis of the mandrel 30. The radius of the arc should provide sufficient slope or inclination with respect to the longitudinal axis of the mandrel 30 that the deflective forces between the strips 35 and the arcuate member 150 ceaselessly urge the strips along the radius of the arc into contiguous juxtaposition. Conversely, the radius of the arc, amount of deflection, and tension in the strips 35 should be adjusted so that the strips 35 do not overlap or pile upon one another.

The arcuate member 150 may be made of any material which will retain its shape at the surrounding temperature created by the heating means 155 and contact with the heated strips 35 and which will not adhere, bond, or fuse to the strips 35. Preferably, the arcuate member 150 is made of the same material as the heating means 155.

Heating means 155 are provided for heating the strips 35 to a softened state. Since some thermoplastics may cool rapidly, the heating means 155 is preferably located in close proximity to the mandrel 30 and may be constructed and arranged to heat the strips 35 at their point of contact with mandrel 30. As best seen in FIGS. 1 and 2, in the preferred embodiment, the heating means 155 is located between the feeder means 45 and the mandrel 30. In the illustrated embodiment, the heating means 155 is attached to and travels with the carriage 100. The heating means 155 may be any heat source which is adaptable to heat the filament reinforced thermoplastic strips 35, e.g., infrared heating, ultrasonic heating, radiant heating, hot gas heating, resistance heating, etc. In the preferred embodiment, as illustrated in FIGS. 1-4, the heating means is a heating die, also designated 155. The heating means or heating die 155 must provide sufficient thermal energy to heat the strips 35 to a thermally softened and/or semimolten state, i.e., the strips 35 must be sufficiently softened or molten and sticky that they will fuse together or cohere as they are contiguously juxtaposed by the joining means and must retain sufficient heat to remain molten and fuse with the adjacent strips 35 previously wound on the mandrel 30.

Referring to the example of FIG. 4, in the preferred embodiment, the heating means or heating die 155 has an exit 160 from which the strips 35 exit to the mandrel 30 and the joining means 50 and arcuate member 150 are located at the exit 160 of the heating means 155. The joining means 50 contiguously juxtaposes the semimolten strips 35 at the point of contact between the strips 35 and the joining means 50 or arcuate member in order to fuse the strips 35 together. The fused strips 35 then travel from the joining means 50 to the mandrel 30 where they fuse with the strips 35 previously wound upon the mandrel 30. As exemplified in FIG. 1, the simultaneously applied strips 35 may be slightly separated as they leave supply means 148. After traveling through the heating means 155 and contacting the joining means 50 at the exit 160 of the heating means 155, the strips are fused together such that the adjacent edges 175 of the simultaneously applied strips are fused and not readily discernible, as illustrated by dashed lines in FIG. 1.

Referring to FIGS. 2-4, the heating die 155 comprises an upper section 165 and a lower section 170. The upper and lower sections define a cavity (not illustrated) through which the strips 35 pass while being heated. The cavity may be shaped to form the Strips 35, i.e., a forming die, and may assist in contiguously juxtaposing the strips 35. The joining means 50 and arcuate member 150 may be mounted on either the upper section 165 or the lower section 170 at the exit 160 of the die 155 so that the strips will pass deflectingly across the inside radius of the arcuate member 150 while traveling to the mandrel 30. The location of the joining means 50 on the upper or lower section 165, 170 will depend on the relative positioning of the heating means 155 and the mandrel 30. Typically, as illustrated in FIGS. 3 and 4, the base 180 of the joining means 50 is connected to the lower section of the die 155 at the exit 160 of the die so that the strips 35 pass over the inside radius of the arcuate member 150.

The base 180 or joining means 50 should be detachably connected to the lower section 170 of heating means 155 with a connector which will hold the joining means 50 in a stable position and which will withstand the forces exerted on the joining means 50 by the strips 35. For example, bolts, screws, clamps, and similar fasteners may be used.

The joining means 50 is preferably located at the exit 160 of the heating means 155 so that the strips 35 will be in a semimolten state as they are urged into contiguous juxtaposition by the joining means 50. The joining means 50 may have its own heat source which can supplement or replace the heating means 155, although the embodiment described previously is preferred.

Although the preferred use of the present invention is with filament reinforced thermoplastic strips 35, the invention is not limited to such uses as it is recognized that the apparatus 20 and method of the present invention may be used to simultaneously wind a plurality of strips 35 of virtually any material capable of being wound or of being contiguously juxtaposed. The preferred strips 35 used with the present invention comprise impregnated filament reinforced thermoplastic strips having a longitudinal axis and at least one strand of continuous reinforcing filaments aligned parallel to the longitudinal axis of the strip. The reinforcing strand of continuous filaments is impregnated and surrounded by a continuous thermoplastic matrix.

Examples of thermoplastic resin suitable for use in forming the thermoplastic matrix are polyolefins such as polypropylene and polyamides such Nylon ®. Polyesters, polycarbonates, and high performance thermoplastics such as polyether-ether ketone (PEEK), polyetherimide, polyphenylene diketone (PPDK), and liquid crystal polymers can also be used. Preferably, the thermoplastic resin used to form the matrix of the thermoplastic strips used in carrying out the present invention comprises a poly (arylene sulfide) (PAS) polymer. More preferably, the thermoplastic resin used is selected from the group consisting of poly (phenylene sulfide), poly (biphenylene sulfide), poly (arylene sulfide arylene ketone), and poly (arylene sulfide arylene sulfone).

The reinforcing filament strands used in the strips 35 can be any fiber strand or strands that do not decompose prior to reaching the processing temperature for the thermoplastic resin used to form the matrix. Preferably, the reinforcing filament is selected from the group consisting of carbon fiber strands, glass fiber strands, and aramid fiber strands.

The filament reinforced thermoplastic strips 35 used with the apparatus and method of the present invention typically have a thickness of about 0.006 inch and a width in the range from one-eighth inch up to several inches.

The apparatus 10 and method of the present invention are not limited to the construction of filament reinforced thermoplastic structures which are wound about a rotating mandrel. For example, the apparatus 10 may be used for contiguously juxtaposing at least two thermally-softened or semi-molten filament reinforced thermoplastic strips 35 traveling from the exit of a strip supply or feeder, such as feeder means 45, to a linear strip user. Such apparatus would comprise an arcuate member 150 located near the exit 160 of the strip supply, such as a heating means or heating die 155, the arcuate member 150 being constructed and arranged with the inside radius of the arcuate member transversely contactable with the strips 35 so that the radius of the arcuate member 150 ceaselessly urges the strips 35 into contiguous juxtaposition.

The invention also includes the method of simultaneously winding a plurality of thermally-softened filament reinforced thermoplastic strips 35 onto a mandrel 30, comprising the steps of: supplying or providing the thermally-softened strips 35; winding the strips 35 onto the mandrel 30; and ceaselessly urging the strips 35 into generally parallel, contiguous juxtaposition at a point prior to the strips' 35 first contact with the mandrel 30. The method may also include the step of deflecting the strips 35 from a linear path of travel with the inside radius of an arcuate member 150 in order to ceaselessly urge the strips 35 into generally parallel, contiguous juxtaposition.

While the invention has been described with a certain degree of particularity, it is manifest that many changes may be made in the details of construction and arrangement of components without departing from the spirit and scope of this disclosure. It is intended to be understood that the invention is not limited to the embodiments and methods set forth herein for purposes of exemplification, that the invention is to be limited only by the scope of the attached claims, including the full range of equivalency to which each element thereof is entitled.

What is claimed is:

1. Apparatus for simultaneously winding at least two filament reinforced thermoplastic strips onto a mandrel, comprising:

a rotatable mandrel for receiving the strips;

winding means for rotating the mandrel and winding the strips onto the mandrel;

feeder means for feeding the strips to the mandrel as the mandrel rotates;

heating means for heating the strips to a thermally-softened state so that the strips will fuse together with the strips previously wound on the mandrel as the strips are wound on the mandrel; and joining means, located between the heating means and the mandrel, for deflecting the thermally-softened strips from a linear path of travel between the heating means and the mandrel and for ceaselessly urging the strips into generally parallel contiguous juxtaposition after the strips have been thermally-softened.

2. The apparatus of claim 1 in which the heating comprises:
an exit from which the strips exit to the mandrel; and
wherein the joining means is connected to the heating means.

3. The apparatus of claim 1 in which the joining means comprises:
an arcuate member constructed and arranged with the inside radius of the arcuate member transversely contactable with the strips, whereby the radius of the arcuate member ceaselessly urges the strips into generally parallel contiguous juxtaposition.

4. The apparatus of claim 3:
wherein the arcuate member deflects the strips at least about one-eighth inch from the linear path of the travel.

5. The apparatus of claim 3 in which the heating means comprises:
a heating die, comprising:
an upper section; and
a lower section, the upper and lower section defining a cavity through which the strips pass while being heated; and
wherein the joining means is mounted on the upper section at the exit of the die so that the strips contact the inside radius of the arcuate member of the joining means.

6. The apparatus of claim 1 in which the heating means comprises:
a heating die, located between the feeder means and the mandrel, for heating the strips to a semi-molten state, the die having an exit from which the strips exit to the mandrel; and
wherein the joining means is connected to the exit of the die.

7. Apparatus for simultaneously winding a plurality of thermoplastic-impregnated-filament strips onto a mandrel, comprising:
a rotatable mandrel for receiving the strips;
winding means for rotating the mandrel and winding the strips onto the mandrel;
feeder means for feeding the strips to the mandrel as the mandrel rotates;
heating means, for heating the strips to a thermally-softened state, the heating means having an exit from which the strips exit to the mandrel; and
joining means, located at the exit of the heating means, for deflecting the strips from a linear path between the heating means and the mandrel and using the deflective forces to ceaselessly urge the strips into contiguous juxtaposition.

8. Apparatus for simultaneously winding a plurality of thermoplastic-impregnated-filament strips onto a mandrel, comprising:
a rotatable mandrel for receiving the strips;
winding means for rotating the mandrel and winding the strips onto the mandrel;
feeder means for feeding the strips to the mandrel as the mandrel rotates;
a heating die for heating the strips to a thermally-softened state, the die having an upper section and a lower section defining a cavity through which the strips pass while being heated, the die having an exit at one end of the cavity from which the strips exit to the mandrel; and
joining means, having a base and an arcuate member, for ceaselessly urging the strips into generally parallel, contiguous juxtaposition; the base of the joining means being connected to the lower section of the die at the exit of the die so that the inside radius of the arcuate member transversely contacts the strips and the arcuate member deflects the strips from a linear path of travel between the die and the mandrel.

9. A method of simultaneously winding a plurality of thermally-softened filament reinforced thermoplastic strips onto a mandrel, comprising the steps of:
supplying the thermally-softened strips;
winding the strips onto the mandrel; and
ceaselessly urging the strips into generally parallel, contiguous juxtaposition and fusion at a point prior to the strips' first contact with the mandrel and after the strips have been thermally-softened.

10. The method of claim 9 in which the urging step further comprises the step of:
deflecting the strips from a linear path of travel with the inside radius of an arcuate member in order to ceaselessly urge the strips into generally parallel, contiguous juxtaposition.

11. Apparatus for simultaneously winding a plurality of thermoplastic-impregnated-filament strips onto a mandrel, comprising:
a rotatable mandrel for receiving the strips;
winding means for rotating the mandrel and winding the strips onto the mandrel;
feeder means for feeding the strips to the mandrel as the mandrel rotates; and
joining means, located between the feeder means and the mandrel, for deflecting the strips from a linear path of travel between the feeder means and the mandrel and for ceaselessly urging the strips into generally parallel contiguous juxtaposition the juxtaposed strips having a width about equal to the added width of the individual strips, the joining means comprising:
a heating source for heating the joining means independently of the strips so that the joining means will thermally soften the strips as the joining means deflectively contacts the strips.

12. The apparatus of claim 11 in which the feeder means comprises:
an exit from which the strips exit to the mandrel; and
wherein the joining means is connected to the exit of the feeder means.

13. The apparatus of claim 12 in which the joining means comprises:
an arcuate member; and
a base, the arcuate member being connected to the base, the base being connected to the exit of the feeder means so that the inside radius of the arcuate member is transversely contactable with the strips.

* * * * *